Nov. 15, 1932.  A. S. CAMERON  1,887,708
INSTRUMENT AND METHOD FOR EXAMINING, TESTING, AND EXERCISING THE EYES
Filed Jan. 18, 1928  9 Sheets-Sheet 1

Fig. 1

Inventor
ALEXANDER S. CAMERON

Atty.

Nov. 15, 1932.  A. S. CAMERON  1,887,708
INSTRUMENT AND METHOD FOR EXAMINING, TESTING, AND EXERCISING THE EYES
Filed Jan. 18, 1928  9 Sheets-Sheet 3

Inventor
ALEXANDER S. CAMERON

Fig 4.

Nov. 15, 1932.  A. S. CAMERON  1,887,708
INSTRUMENT AND METHOD FOR EXAMINING, TESTING, AND EXERCISING THE EYES
Filed Jan. 18, 1928  9 Sheets-Sheet 9

Inventor
ALEXANDER S. CAMERON

Patented Nov. 15, 1932

1,887,708

UNITED STATES PATENT OFFICE

ALEXANDER S. CAMERON, OF CHICAGO, ILLINOIS, ASSIGNOR TO WILLIAM J. CAMERON, OF CHICAGO, ILLINOIS

INSTRUMENT AND METHOD FOR EXAMINING, TESTING AND EXERCISING THE EYES

Application filed January 18, 1928. Serial No. 247,724.

Primarily this instrument is designed for the purposes of exercising the eyes of a patient whereby a stimulating effect is had upon the eye muscles, but it is not limited to such use, for it will be seen, as the description proceeds, there are numerous other uses for which the device may be dependably employed. Where eye muscles have become dormant or relatively inactive from defect or lack of corrective exercise it has been ascertained that exercise or calisthenics administered to these muscles will create a stimulating effect upon them, so that after a course of treatment the muscles become revived and active and will function in the proper and natural manner.

The light from an object is formed upon the retina of the eye and from the rods and cones thus stimulated the impulses travel along the optic nerve fibers to the brain. The intensity with which these nerve impulses are delivered to the brain depends entirely upon the intensity of the stimulation and the efficiency of the nerve fibers. Therefore the efficiency of optic nerve fibers in normal persons depends upon the frequency of their use, with the result that each time a nerve fiber conveys a normal impulse, it becomes more proficient to act in its normal manner. The brain neurons relay the impulses from the optic nerve to the visual and "motor" centers, and the number of these affected by an impulse depends upon the intensity with which that impulse has been delivered by the optic nerve, while the particular neurons to initially relay the message depends upon the nature of the impulse and the previous experience of these neurons with similar impulses. Upon arriving at the association centers of the brain, the impulses are relayed, some direct to the motor centers, and some to the visual centers.

If the nature of the object in space is sufficiently conspicuous, for example if it is in motion, one of the normal muscular reactions is the movement of the eyes so that the image of the object is focused upon the macula. From the macula, impressions are relayed to the visual centers of the brain where the patient becomes aware of the light, motion, color, form, etc., of the object in space. The normal eye is constantly in the act of exploring and investigating the world about. If the objects so investigated are comparatively unimportant, or not threatening to the safety of the individual, they may never sufficiently impress the mind to make the person aware of the fact that he has "seen" these objects. It naturally follows the entire path traveled by the nerve impulses must be established in abnormal conditions in accordance with the procedure of nature in developing the normal pair of eyes.

Lack of proper coordination between the eyes may be corrected by training the eyes to maintain proper relationship to each other, in the same manner as physical training or development may be more readily accomplished by performing the exercises accompanied by music.

Rhythmic ocular movements are the most effective exercises, more rapidly correcting imperfect ocular coordination and most effectually training the eyes to function perfectly and with efficient automaticity.

The present instrument is based upon the fundamental principles of rhythmic stimulation and the irresistible fascination of observing and following with the eyes a moving light in a darkened room. In the use of this instrument the eyes are led, not driven by thought, through the various rhythmic movements or exercises that have been selected by the operator as the most desirable calisthentics for the particular patient. The instrument is constructed so that while it is in operation and projecting a moving object at one given angle adjustment may be made to move the object at another angle, or increase or diminish the path traversed by the object. Also while the apparatus is in motion, and moving the projected object at a given angle it may be readily adjusted to move the object in a circle and the diameter of the circle may be changed during operation without interrupting the projection of the object, and it will be understood that reverse adjustments may also be accomplished in the same manner. Means are also provided to readily change or modify the speed at which the projected object is moved upon the screen so that variable speeds from very slow to very fast may be attained. With this instrument the measurement and charting of the ocular field of a patient may be readily made in much the same manner as with a perimeter; also the measuring and charting of the patient's color fields, form fields, and the determination of the so-called "blind spots"; all of such readings being ascertained from a scale or scales upon the instrument.

In the present instrument, bi-chromatic images can be projected and viewed through bi-chromatic scopes or transparent plates for the complete disassociation of the two eyes and to produce the same effect as when ophthalmic prisms are placed directly before the eyes of the patient. This is accomplished by the use of one or more colored prisms that may be adjusted back and forth between the light and the lens for the purpose of separating the projected colored images different distances apart upon the screen and thereby produce a greater or less prismatic effect upon the patient's eye. By projecting one or more images through prisms in colors complementary to the scopes before the patient's eyes the instrument performs the functions of a phorometer, when the projected images are observed through the bichromatic scopes, one side of which contains a color complementary to the color on the other side, and by the use of scales on the instrument, measurement may be made of any deviation, or tendency to deviate, vertically or laterally from parallelism of the visual axis of either or both eyes; also any tendency of either or both eyes to rotate on this visual axis.

There is provided in connection with this instrument a septum that is constructed and arranged to mechanically divide the binocular field into a plurality of zones, for instance, a right, a left, and a central zone, the extremes of each of the first two zones being separately visible to the respective eyes and the last or central zone being visible to both eyes at the same time. These, of course, are only a few of the many possible combinations. This septum may be used in different positions in conjunction with the image moving upon the screen, thus alternately stimulating and occluding (or excluding) each eye. This creates successive stimulations, each stimulation occurring before the previous stimulation has entirely faded, depending upon the speed of oscillation of the image, and will lead to the ultimate correction of strabismus (crossed eyes), or hetrophoria (tendency toward cross eyes), as well as improve ambylopic eyes (dim eyes), and also develops the function of accommodation.

It is the primary object of this invention to provide an instrument that is readily capable of operating as hereinafter set forth and of accomplishing the purposes for which it has been designed in an effective and dependable manner. Further objects reside in providing an instrument that is comparatively simple in construction, novel in the disposition or arrangement of its parts, and which may be placed upon the retail market at a price that is considerably less than the cost of installing separate instruments for accomplishing the various functions that are performed by it.

It is preferred to carry out this invention and to attain the several objects thereof, in substantially the manner hereinafter fully described and as more particularly pointed out in the claims, reference being herein made to the accompanying drawings, that form a part of this specification.

The drawings are, in a sense, merely schematic, for the purpose of disclosing a preferred or typical embodiment of the invention, and in said drawings similar reference characters have been employed to designate the same parts wherever they appear throughout the several views. For the purpose of convenience, the portion of the instrument nearest the patient will hereinafter be designated the rear end or back, while the opposite portion will be referred to as the forward end or front.

There is a circular base 1 upon which a table 2 is rotatably mounted that has a pair of upstanding pivot lugs 3 arising from its upper surface. This base and table are connected by means of a shouldered bolt 4, the threaded portion of which is screwed into the threaded boss 5 on the underside of the table and the shoulder of the screw abuts against the end of the boss and the head engages a depressed portion surrounding the aperture 6 made in the center of the base, so that after the bolt has been tightened the table may be rotated independently of the base to permit of the turreting motion of the table that is desirable in the use of the instrument. A scale 7 on the beveled edge of the table may be read by a pointer 8 carried by the base to indicate the angularity of the projecting tube of the instrument or the distance the turret table may have been rotated from one position to another in charting or measuring the visual or other fields of the patient's eyes.

The operating mechanism of the instrument is carried by a standard 9 the lower end of which is positioned between lugs and hingely connected thereto by a pivot bolt 10, and there is a shelf 11 extending rearwardly from the standard to receive and support the electric motor 12. The standard is adapted to be tilted or moved in a vertical plane by providing a segmental gear 13 having worm-teeth upon its lower edge that project through the upper face of the turret-table 2 where said teeth are engaged with a worm 14 upon the adjacent portion of a rotatable horizontal shaft 15 that is journaled in suitable bearings in the table. An end of shaft 15 projects through the skirt or sidewall of the table where it is provided with a handwheel 16 for rotating it and the amount of tilt thus given to the standard and parts carried thereby may be read upon a scale-plate 17 on one of the lugs 3 through the medium of a pointer 18 that is secured to the adjacent end of pivot bolt 10.

At its rear the base 1 is provided with sockets 18 into the bores of which are inserted the elongated lateral rods 19 of a removable frame that carries the bi-chromatic scope and the septum. This frame consists of a lower main portion having an upright arm 20 from the lower portion of which project the straddling feet 21 to which the rods 19 are secured. There is a socket 22 in the upper end of the arm 20 having a rectangular bore into which a rod 23 is inserted so that the latter may be moved up and down in the socket to raise or lower the septum and scopes and it is secured in its different positions by a clamping or set screw 24. A head 25 is provided upon the upper end of rod 23 from which there arises the arms 26 having their upper portions substantially straight and vertical while the lower portions curve rearwardly and downwardly to meet at the head 25 to provide a chin rest. The upper ends of arms 26 are connected by a forwardly curved metal strap 27 against which the patient may rest his forehead when the chin is resting upon the chin rest. At about midway its length, the strap 27 is provided with a vertical cylindrical boss 28 into the bore of which is inserted the upper hooked end of the spindle 29. The septum consists of a pair of plates 30 and 31, preferably of metal, that are mounted the one above the other in a hinged or swinging arrangement upon the spindle 29. The rear or inner ends of the septum plates are formed into cylindrical knuckles 32 through which the spindle passes, and at the lower end of the spindle is placed a flanged nut 33 that retains the septum plates upon the spindle and presses the edges of the knuckles frictionally against each other and up against a stop 34 on the upper portion of the spindle below its hooked end. This permits the septum plates to be moved independently into different positions to divide the binocular field into a plurality of zones, namely the central zone that is visible to both eyes of the patient at the same time by placing the septum plates in a position alining with each other and straight out from between the patient's eyes, and the right and the left zones that are provided by turning the plate to obscure the left or right eye. With this arrangement it is also possible, by properly positioning the patient's head with the pupil of the eye at the horizontal plane or juncture line between the plates to divide any of the above mentioned zones into upper and lower fields or areas. When the septum plates are used in connection with the image projected by the apparatus and moving the image in the desired direction there is created in the patient's eye under treatment successive stimulations, that are effective alternately upon each eye and each stimulation occurs before the preceding stimulation has worn off or faded. This stimulation may be increased by increasing the speed of movement of the projected image. This alternate and successive stimulation is controlled by the speed with which the projection tube is oscillated and it is valuable in the treatment of, and frequently results in the correction of strabismus (crossed eyes).

Below the strap the upright arms 26 have shoulders 35 that are provided with small bores to receive the dowels or lateral pins 36 at the ends of the supporting bar 37 upon which the bi-chromatic scopes are mounted. The bar 37 is of a wide or flattened V-shape as seen in the top plan view and it is arranged with its apex immediately back of the depending septum above described. Semi-circular shaped metal holders 38 depend from the respective portions of the bar 37 and the bi-chromatic plates 39 are removably inserted in said holders. Said plates are preferably formed of transparent glass and are colored red and blue respectively, or other complementary colors so that the principles of a phorometer may be utilized in connection with the prismatic projection of an image upon the screen, which image, upon being passed through the colored prisms will be displayed as two complementary colored images on the screen. By means of scales and other mechanism to be later described the movement of changes of position of the image or images may be noted and read so that the operator may measure any deviation from parallelism of the visual axes, or the deviation from the vertical meridian of either or both eyes, known as cyclophoria.

A transmission gear 40 is rotatably mounted upon a horizontal axis on the standard 9 about midway the height of the latter, which gear is actuated by the pinion 41 that is fast upon the shaft of the motor 12, and the hub of this gear 40 is provided with a pinion 42 that is in mesh with and drives a gear 43 upon the adjacent end of the main or operating shaft 44. This latter is positioned with its axis in a horizontal plane in suitable bearings in the top of the standard, and there is a sleeve-shaft or telescopic-shaft 45 mounted upon said shaft that remains normally stationary unless a clutch is operated to connect the two shafts to cause them to move together. The telescopic-shaft has the head of the apparatus mounted upon is outer end, which head consists of a hollow casting forming a circular back plate 46 from the edge of which extends a cylindrical flange or rim 47 having a 360° scale 48 upon its outer surface from which readings may be taken as will be hereinafter described. A pair of supporting arms 49 of compound curved or ogee shape project forwardly from the face of the head within the rim and at their outer ends are provided with alining facing bearing bosses 50 to receive the trunnions 51 of the oscillatory and rotatable image projecting elements of the instrument. This structure comprises a lamp housing that consists of a tube 52, that is carried by the trunnions, the rear end of which is closed by a cap 53 that is screwed thereon and carries an insulation disk 54 that is provided with a socket 55 for an electric lamp or bulb 56. The conductors 57 enter the housing through a bore 58 in one of the trunnions and lead to the binding posts 59 upon the disk from which the usual electric connections are made with the socket and bulb. The opposite end of the housing has a cap 60 screwed into it and is provided centrally with an aperture 61 and upon diametrically opposite sides of the aperture there are bosses 62 for the mounting of the shutter or screens 63 that are rotatably mounted upon the respective bosses by means of shouldered screws 64. There are a plurality of apertures 65 arranged concentrically about the axis of each shutter 63, and the shutters have portions of their edges extended through transverse slots in the end cap 60 so that they may be rotated, the apertures 65 being so arranged that they may be successively moved into alinement with each other on the respective shutters and with the projection aperture 61 in the cap. The shutter apertures contain colored screens and images of different shapes so that images having different forms may be projected from the instrument either in colors or without coloration as desired depending upon the service to which the instrument is being put. At one side of the interior of cap 60 there is an embossment 66 to which a spring 67 is secured intermediate its ends and its ends carry transverse pins 68 to engage notches or depressions 69 made in the faces of the shutters 63 so as to maintain the latter in their adjusted position, but permit their ready adjustment whenever desired.

Figures 14, 15, 16, 17:
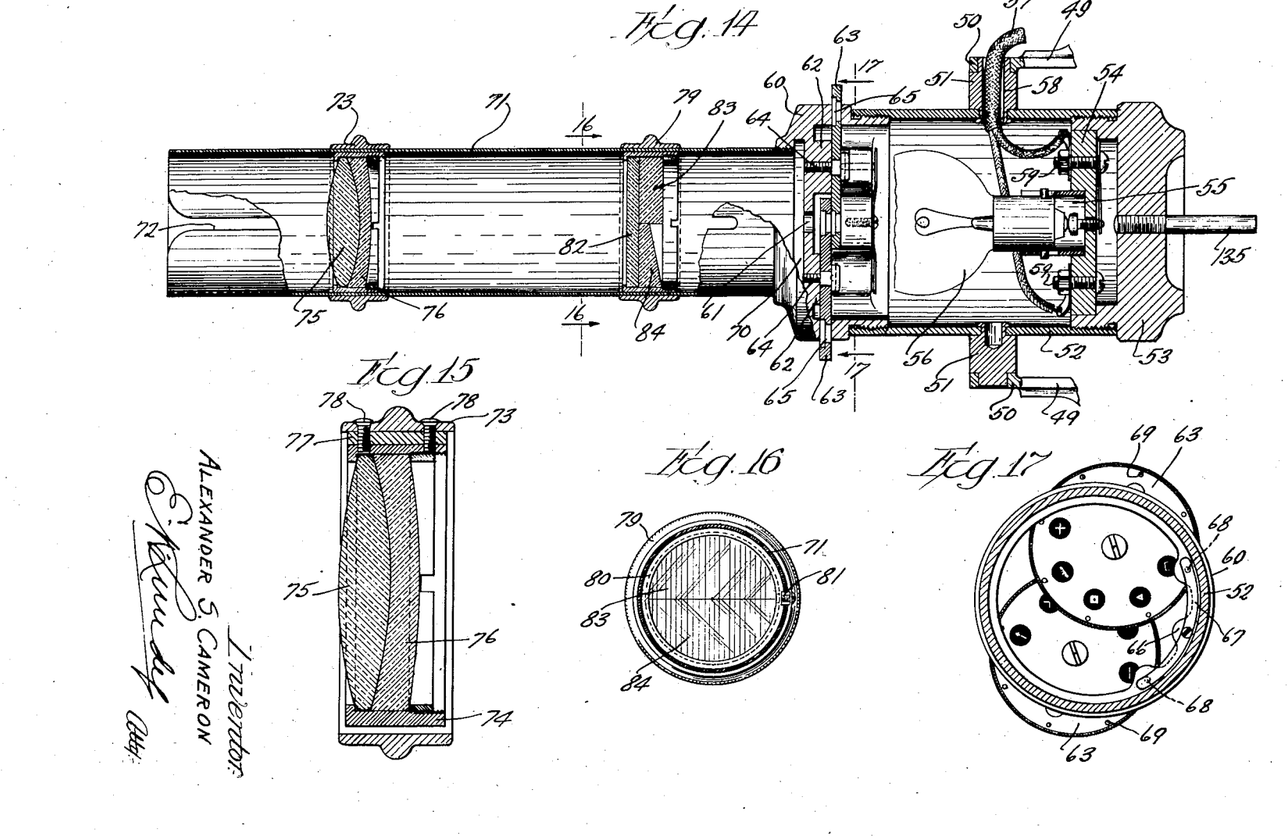
Figure 14 is an enlarged detail of the projection tube taken upon the longitudinal axis of the tube on line 14—14 of Fig. 3.
Figure 15 is an enlarged transverse section of the condensing lens unit detached from the tube and viewed at an angle to the detail shown in Figure 14.
Figure 16 is a transverse section on line 16—16 Figure 14 showing the prism unit.
Figure 17 is a transverse section on line 17—17 of Figure 14 showing certain details of the image and color diaphragms.

The outer portion of end cap 60 is provided with a recess 70 the sides of which are threaded to receive the projection tube 71 that is threaded at its inner end and screwed therein. The tube 71 has an elongated longitudinal slot 72 open at the outer end to permit the mounting and longitudinal adjustment of the condensing lens unit and the prism device, it being understood that the latter is omitted from the tube except in cases where it is desired to project two colored images upon the screen. The condensing lens construction consists of an exterior ring 73 that slides upon the exterior of tube 71 and carries a lens ring 74 in which is mounted the double-convex lens 75 and the concavo-convex lens 76. The lens ring 74 is of such exterior diameter and is spaced away from the interior surface of the carrier ring 73 a distance sufficient to permit said lens ring to enter and be moved longitudinally within the projection tube 71 while ring 73 is on the outside of the tube, such spacing of the rings being accomplished by interposing a small spacer block 77 between adjacent faces of the rings and the connecting of the rings by screws 78 that pass through the outer carrier ring, the block, and into the inner lens ring as detailed in Fig. 15. It will be understood the spacer block 77 is of such dimension that it will enter the slot 72 in the projection tube when the lens structure is mounted upon said tube and it may be moved back and forth and maintained in adjusted positions due to the frictional fit of the parts. The prism structure consists of a ring 79 that may be mounted upon the tube and has a carrier ring 80 spaced from its inner circumference by the spacer block 81 and the carrier ring contains plain disk 82 back of which there is placed the colored glass semicircular disks 83 and 84 one of which is plane and the other of which is prismatic in cross section. The semi-circular disks 83 and 84 are of complementary colors so that, when an image from the shutters 63 is passed through the same, the light rays, bending through the prism but passing straight through plane disk, will cause a separation of the light rays with the result that two spaced images will be projected upon the screen in the complementary colors of the prism device.

The distance these images are separated from each other upon the screen depends upon the distance the prisms are positioned from the shutters 63, and this separation of the projected images may be adjusted by sliding the prism-carrying ring longitudinally upon the projected tube 71.

Figure 1:
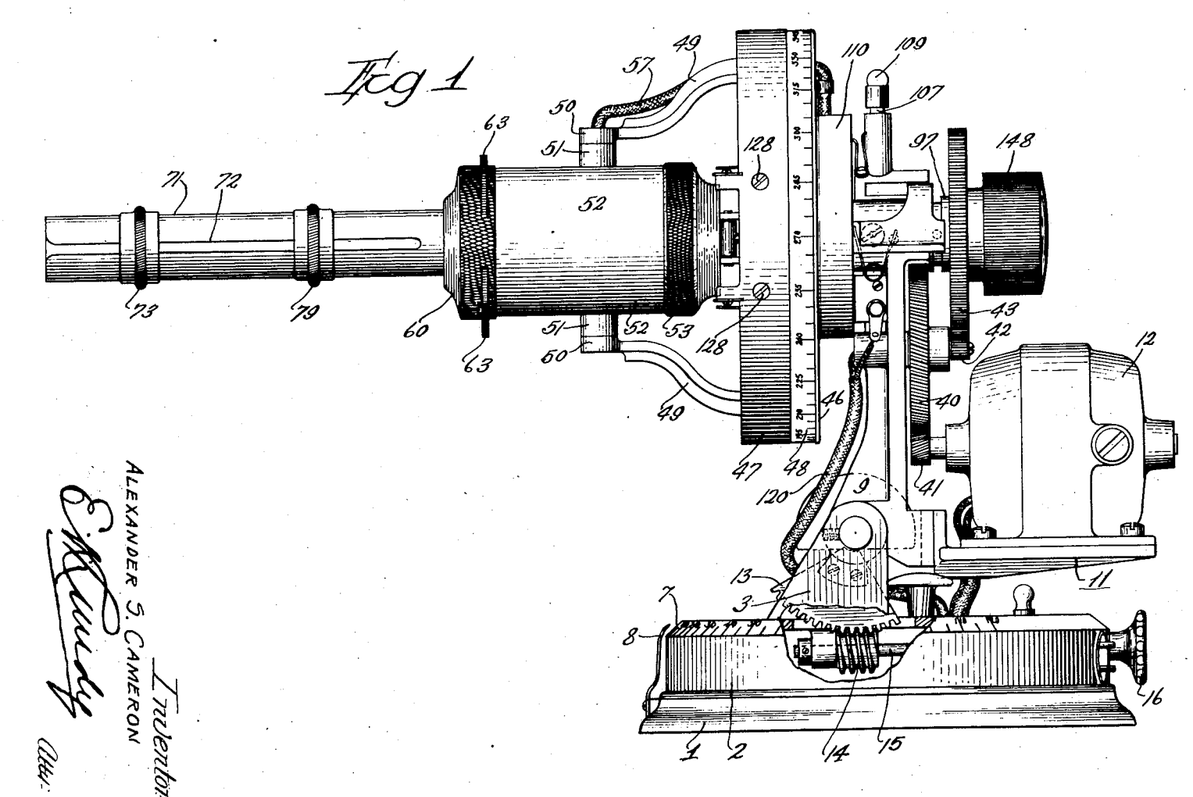
Figure 1 is a vertical longitudinal side elevation of the instrument with the septum and scopes dismantled for clearness.
Figure 2:
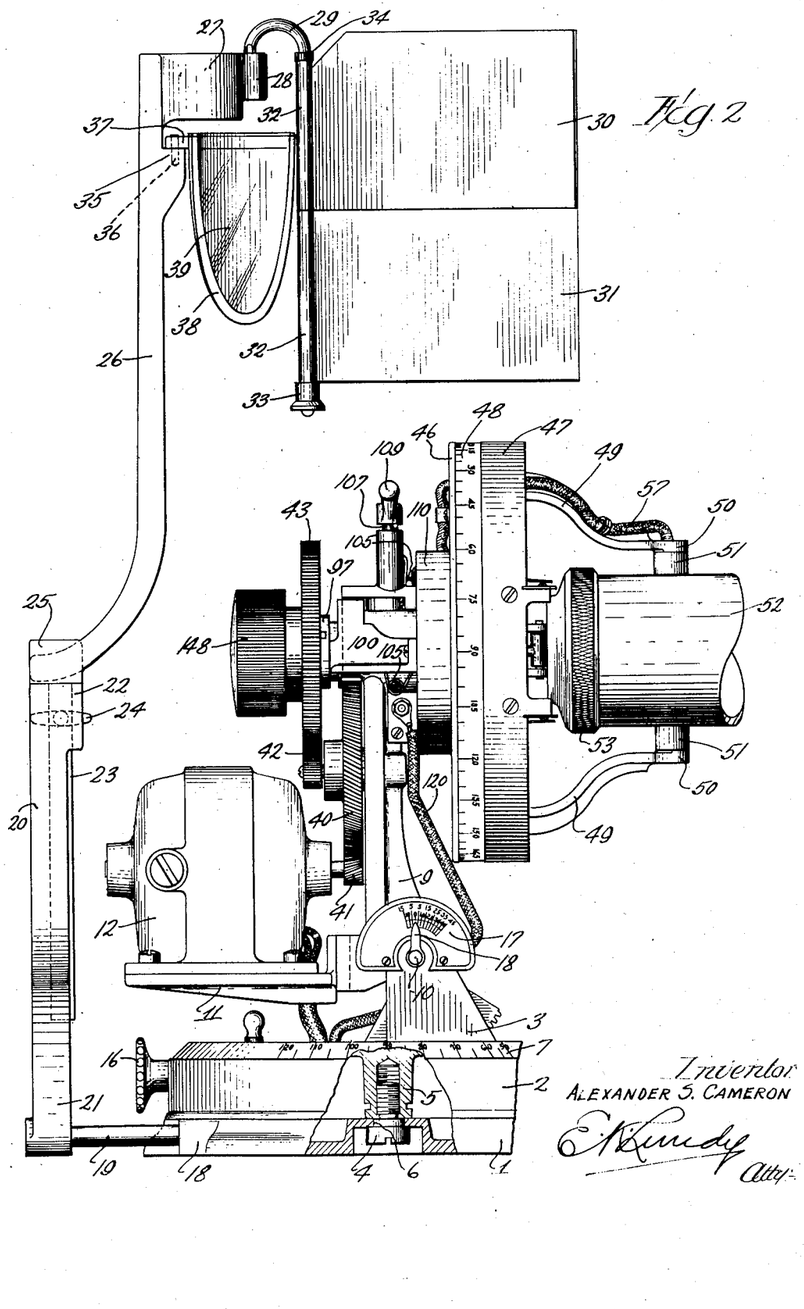
Figure 2 is a similar view of the opposite side of the instrument with a portion of the projection tube broken off and showing the septum and scopes in position.
Figure 3:
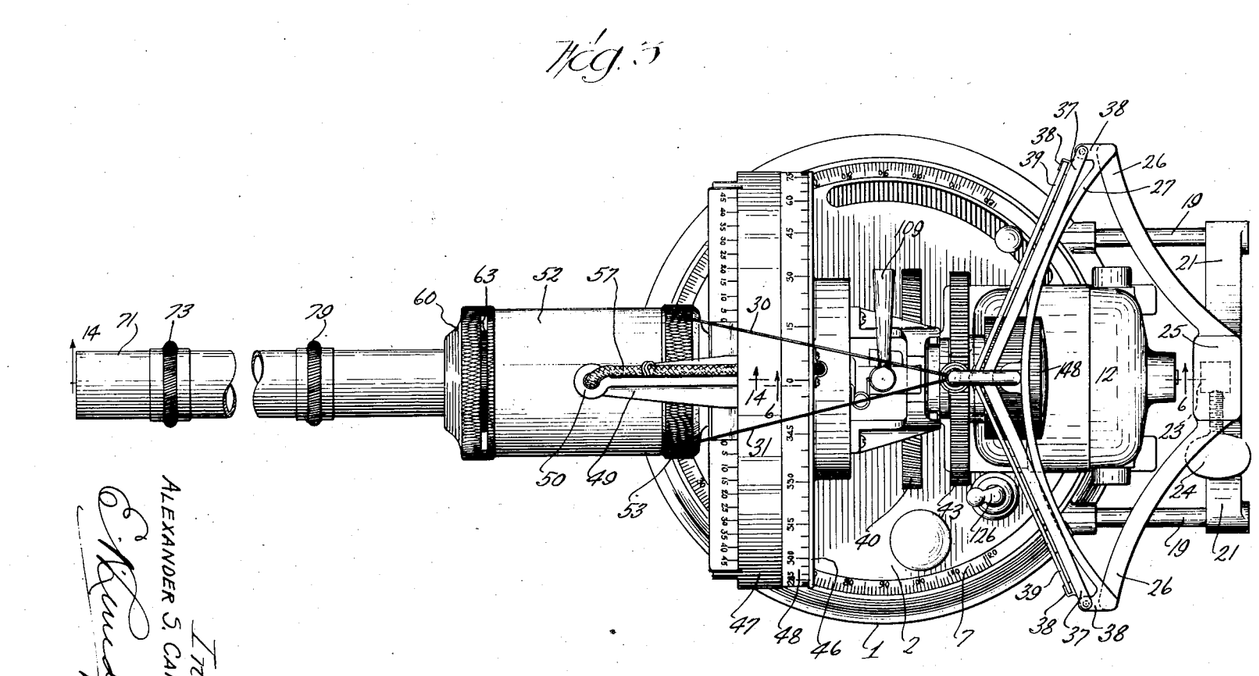
Figure 3 is a top plan of the instrument.
Figure 4:
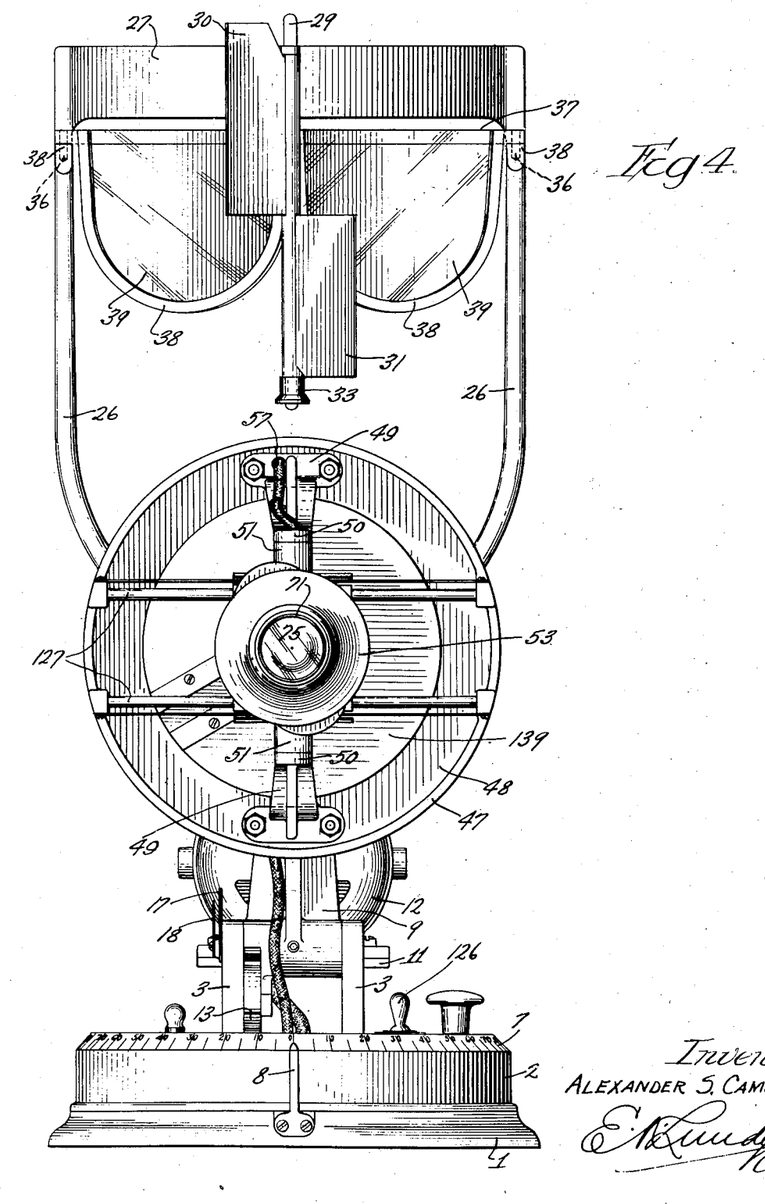
Figure 4 is a vertical front elevation facing the projection tube.
Figure 5:
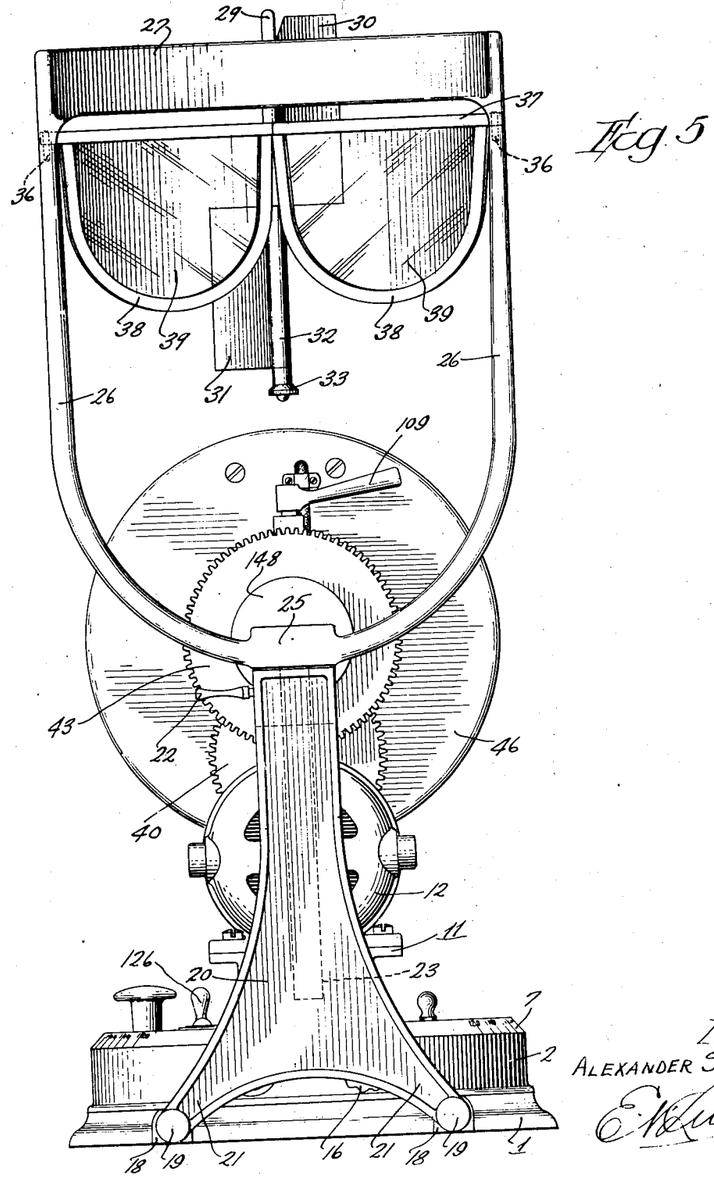
Figure 5 is a vertical rear elevation looking at the end nearest the patient.
Figure 6:
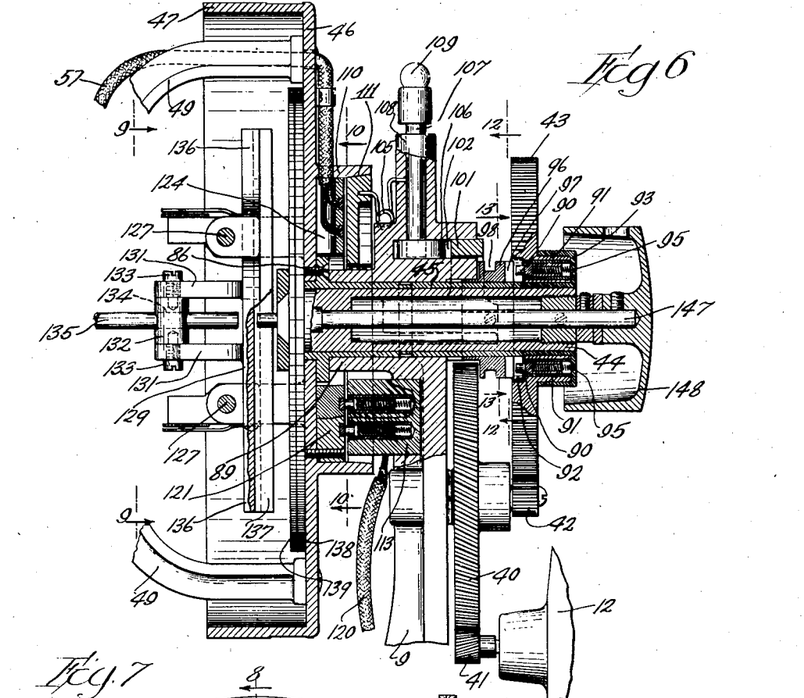
Figure 6 is a vertical axial section taken on line 6—6 Fig. 3 and showing in detail the construction and arrangement of driving and adjusting parts of the instrument.
Figure 18:
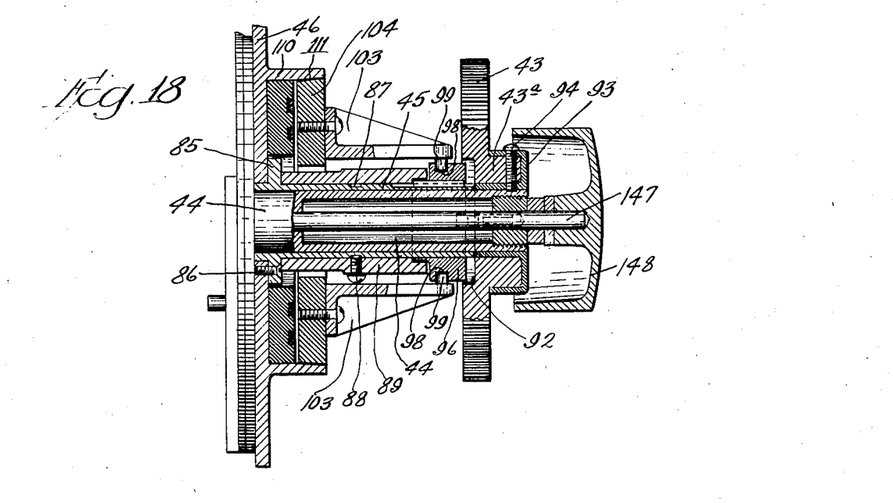
Figure 18 is a horizontal longitudinal section on line 18—18 of Figure 12 looking in the direction of the arrows.
Figure 19:
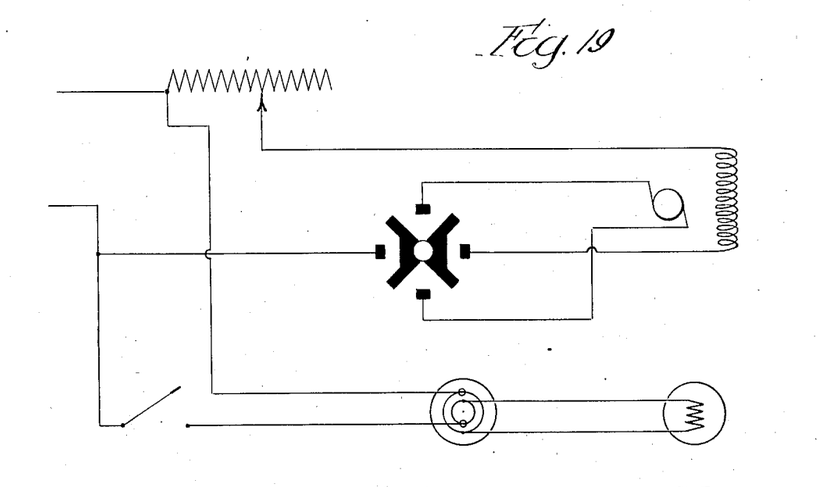
Figure 19 is a schematic lay-out of the wiring of electric system.

Adjacent the forward or front end of the hollow telescopic shaft 45 there is a lateral flange 85 to which the back plate 46 of the head is secured by screws 86 so that when said telescopic shaft is rotated the head will revolve therewith. Back of the flange 85 there is an annular groove 87 extending around the telescopic shaft that is entered by a retaining pin or bolt 88 tapped through the horizontal bearing boss 89 at the top of standard 9 and prevents longitudinal movement of said telescopic shaft but permits of its rotation. The means for connecting the main shaft 44 to the telescopic shaft 45 comprises a clutch mechanism mounted upon or connected with respective shafts. The clutch mechanism carried by the main shaft 44 comprises a pair of clutch pins 90 depressably mounted in bores or sockets 91 made in the hub of gear 43, which bores or sockets are arranged preferably diametrically opposite each other and operating ends of these pins project into an annular recess 92 made in the face of the gear nearest the cooperating clutch members. The hub 43a of gear 43 is preferably surrounded by a metal shell 93 the central portion of which enters the bore of the gear as seen in Figs. 6 and 18 and is hollow so as to be removably mounted upon the main shaft 44 by means of a set screw 94 that passes through and connects the parts as seen in Fig. 18. The clutch pins 90 normally are urged outwardly to their limit of movement by means of springs 95 seated back of them and held under compression by the shell 93. The opposing clutch member consists of a shiftable block 96 slidably mounted upon the exterior of the telescopic shaft 45 and is feathered thereon by a key $x$ that permits said block to rotate the telescopic shaft whenever the clutch is thrown in. The diameter of the block is less than that of the recess 92 in the adjacent gear 43 and the face of the block next to said gear is provided with radial channels 97 into which the spring-pressed clutch plungers 90 will enter when the block is moved toward the gear. The rim of the block 96 is provided with a continuous groove 98 in which the guide studs 99 of the clutch yoke operate. The clutch yoke has oppositely curved segmental arms 100, in the lower ends of which pins 99 are transversely mounted, and their upper ends are connected by a straight guide portion 101 that slides back and forth horizontally in a slot 102 in the upper portion of the standard above the bearing. Extensions 103 project forwardly towards the front of the machine from the lower ends of the arms 100 and are securely mounted upon the adjacent face of a brake-shoe or disk 104. Springs 105, preferably three in number, are interposed between this brake shoe 104 and the adjacent portions of the standard so that said shoe and the clutch yoke and the connected clutch member are urged normally away from the gear 43 to maintain the respective clutch elements in disconnected positions and also prevent rotation of the head when not desired, as is later described. The means for operating the clutch consists of a cam 106 rotatably mounted in the slot 102 alongside of and engaging the slide portion 101 of the yoke, and said cam is secured to the lower end of a vertical spindle 107 that is journaled in an upstanding bearing boss 108 at the top of the standard 9 and the upper end of the spindle that projects beyond the boss is provided with an operating handle or lever 109. The arrangement of the clutch is such that the motor may be running, with the gears driving the main shaft 44 and with the head stationary and at any time the cam may be operated to shift the yoke which will slide the clutch block 96 on the telescopic shaft 45 until the face of said block depresses the clutch pins or plungers 90 until such time as said pins or plungers come into registration with the radial channels 97 of the block, whereupon said pins or plungers will enter said channels and the co-operating parts of the clutch will be rotatably locked together so that the telescopic shaft 45 will be caused to revolve with the main shaft and the head of the apparatus will also be rotated therewith because of its connection with said telescopic shaft. There is a circular wall or flange 110 that projects rearwardly from the back plate 46 of the head to cooperate with the brake-shoe to house portions of the electrical conductors and the current collectors. The inner surface of this wall adjacent its edge is slightly beveled as at 111 so as to be engaged by the adjacent beveled edge of the brake disk 104 when the latter is in position to prevent rotation of the head while the clutch members are disengaged.

The brake disk 104 is provided with a cut-out portion or recess 112 that extends inwardly and upwardly from its lower segment to a point above the shafts and the transverse bearing boss 89 and said cut out portion is wide enough to permit the mounting of a terminal block 113 of insulating material upon the standard 9 so that it projects into said recess. In this block 113 a pair of yieldable or retractable contact pins 114 and 115 are mounted in tubular terminals 116 and are backed by coiled springs 117. Conductors 118 and 119 lead from binding posts on the block into a cable 120 that leads to a source of electric supply through the base and table. An insulating disk 121 is mounted in the inner portion of the flange wall 110 and has a pair of annular contact rings imbedded in its surface next to the brake shoe 111 and facing the end of the block 113, which rings are spaced apart the same distance as the vertical disposition of the contact pins 114 and 115 respectively. The face of the insulating disk next to the back plate 46 of the head has a passageway 124 cut radially therein to receive the ends of the wires in conductors cable 57 that leads into the lamp tube or house and the central portion of the insulating disk has a central opening 125 of sufficient dimensions to permit the disk to surround but not touch the main bearing and shafts of the apparatus. Thus it will be seen that the current for the lamp is transmitted through the cable 120, the contact pins 114 and 115, to the contact rings 122 and 123, and thence through conductor cable 57 to the lamp whenever the current is turned on by the switch lever 126 on the top of the turret table 2. This also permits the rotation of the head and the projection tube upon the axis of the main and telescopic shafts and the light may be switched on or off whether the head is being rotated or is stationary.

Figure 9:
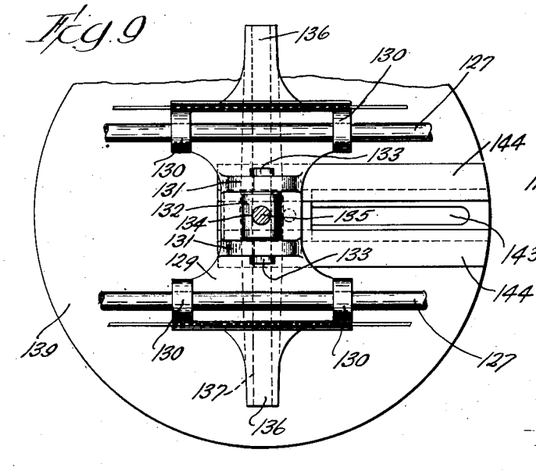
Figure 9 is a front elevation detail of the sliding spider, the view being indicated at 9—9 on Fig. 6 and looking in the direction of the arrows.
Figure 10:
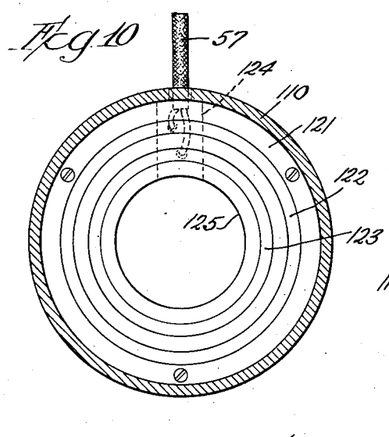
Figure 10 is a detail, in elevation of the electrical contact ring plate, the view being a section on line 10—10 of Figure 6 and looking in the direction of the arrows.
Figure 11:
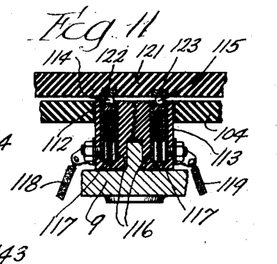
Figure 11 is a sectional view of the contact block that coacts with the ring plate, and taken on line 11—11 of Figure 12.
Figure 12:
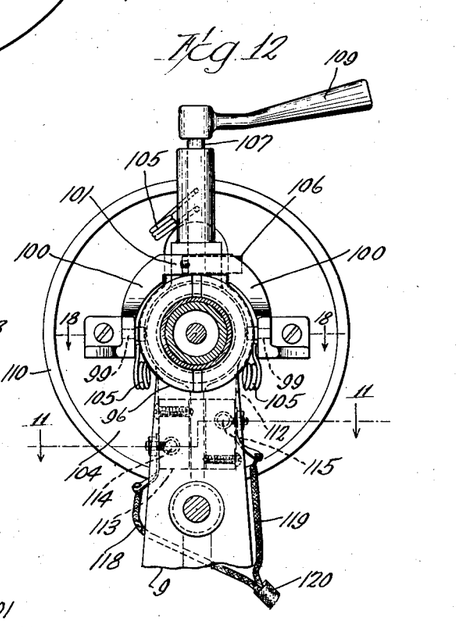
Figure 12 is a vertical transverse section on line 12—12 of Figure 6 looking in the direction of the arrows and showing details of the clutch mechanism that changes the movement of the projection tube from an oscillatory movement to a rotary movement and vice versa, while the instrument is in motion.
Figure 13:
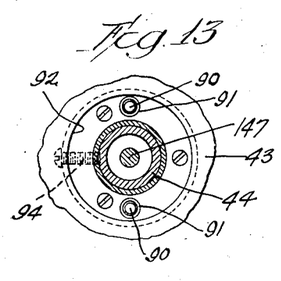
Figure 13 is sectional view of another, or coacting portion of the clutch, the view being taken on line 13—13 of Figure 6, and looking in the direction of the arrows.

The projection tube may be oscillated upon its trunnions by means of a slide mechanism carried by the head, which slide is made adjustable for the purpose of controlling the length of movement of the outer end of the projection tube, and the parts are made and arranged so that the adjustment may be made while the tube is being oscillated. Said tube may also be adjusted while it is in motion so as to change the direction of movement thereof to any position from a horizontal to a vertical plane or to any angle in the 360° of a circle. When the head is rotating the tube does not oscillate but moves in a circle and the diameter of the circle may be adjusted while the tube is in motion, by changing the position of the slide control or "reach" device. This mechanism will now be described in detail. Guide rods 127 are mounted in parallel relation to each other on the rim or flange 47 of the head by means of set screws 128 so that they are positioned slightly back of the edge of said flange, and upon these rods there is mounted a sliding spider 129 that consists of a casting having a plurality of guide bosses 130 on one surface through the bores of which the guide rods 127 are inserted so as to permit the spider to be reciprocated upon said rods. Intermediate the rods the spider is provided with a pair of lateral parallel lugs 131 between which a swivel block 132 is mounted by means of shouldered bolts 133 (Fig. 6). This swivel block is provided with a transverse bore 134 to receive the stud or quill 135 that is mounted and projects axially from the rear closure cap 53 of the lamp housing at the rear of the projection 2. Thus it will be seen that when the slide is reciprocated upon its guide rods the connection between the same and the projection tube will cause the latter to oscillate and the length of oscillation of said tube is controlled by the length of reciprocation of the spider. By rotating the head of the apparatus the oscillation of the projection tube may be directed in planes at any angle desired. The spider is preferably elongated in a direction transverse to its direction of movement and also transverse to axes of the guide rods 127 by providing oppositely disposed extensions 136, as seen in Fig. 9, and there is provided upon the back of the spider an elongated groove or channel 137 that extends throughout the length of the spider including its extensions 136.

Figures 7, 8:
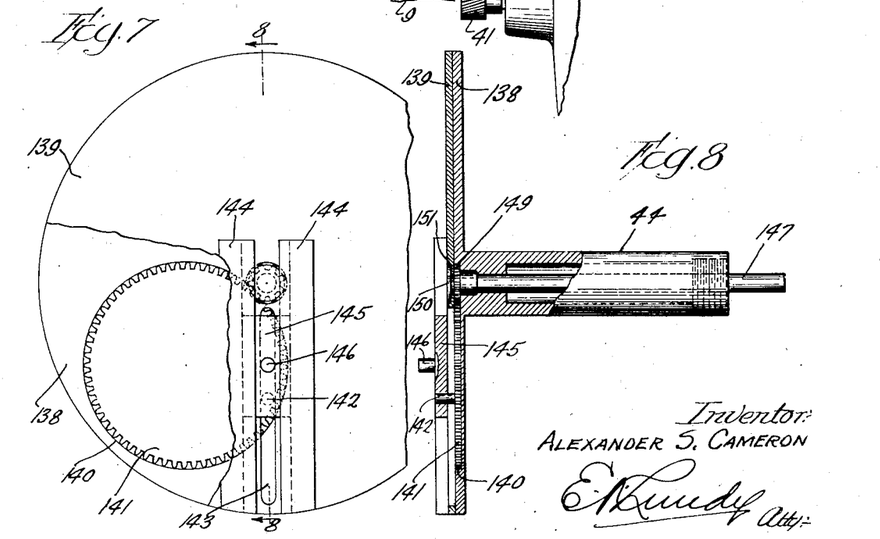
Figure 7 is a detail, partly broken away, of the stroke or circle changing mechanism.
Figure 8 is a central sectional view taken on line 8—8 of Fig. 7.

The means for reciprocating the spider, and for adjusting and controlling the length of movement thereof, comprises a pair of face to face disks 138 and 139, the former disk (138) being preferably formed integral with the main shaft 44 (Fig. 8) and has a shallow circular depression 140 in its face next to the opposing disk in which there is loosely placed a large gear 141 having a crank pin 142 projecting laterally therefrom through a radial slot 143 in the opposing disk 139. Upon the sides of the slot 143 the disk 139 is provided with a gib-way in the form of spaced undercut bars 144 mounted upon the disk 139 in parallel relation to each other and to the slot. A reach block 145, having beveled or chamfered edges is slidably mounted in the gibway and is provided with a transverse bearing hole in which the pin 142 is entered. Said reach block has a centrally disposed transversely projecting stud 146 that operates in the channel 137 of the spider so that when the gear 141 is rotated, the reach block will reciprocate and will slide the spider upon its rods and thus oscillate or adjust the projection tube. It will be noted that the rotation of the gear 141 also causes a rotation of the disk 139 independently of the companion disk 138 which is attached to the main shaft 44. The main shaft 44 is hollow for a portion of its length and at its ends the ore is reduced to provide bearings for a control rod 147, one end of which protrudes through the rear end of the shaft and has a knurled hand wheel 148 secured to it. The opposite end portion of the rod 147 is provided with a small pinion 149 that is fast thereon and upon its extremity there is a flat disk 150 that fits into a depression 151 in the outer face of disk 139. A portion of the disk 139 is disposed between adjacent faces of pinion 149 and disk 150 with the intermediate portions of the rod 147 positioned in a central opening in the disk which permits the rod to rotate independently of the disk 139. In order to receive the pinion 149 and its hub, the adjacent end portion of the bore of main shaft 44 is shaped to conform with the shape of these parts as will be seen in Fig. 8. Pinion 149 meshes with gear 141 so that by simply rotating the hand wheel 148 the control rod is caused to rotate, thereby actuating the reach-block through the pinion and gear and consequently adjusting the spider and the angular or other positions of the projection tube.

What I claim is:

1. A device of the kind described comprising a tube provided with means for projecting a pair of like images in complementary colors upon a screen, said means being adjustable to separate the images different distances apart, and devices for moving said tube means to cause the images to travel in a given path upon the screen and return.

2. A device of the kind described comprising a tube provided with means for projecting a pair of like images in complementary colors upon a screen, said means being adjustable to separate the images different distances apart, devices for moving said tube to cause the images to travel in a given path upon the screen and return, and other devices, operable while the tube is in motion for simultaneously and correspondingly modifying the path of movement of the images.

3. A device of the kind described comprising means for projecting a plurality of like images in complementary colors upon a screen and moving said images in a to and fro path, bi-chromatic scopes through which said images are viewed, said scopes arranged side by side adjacent the projecting means, and a septum between said scopes that divide the visual field of the patient.

4. A device of the kind described comprising a movable projector through which a pair of bi-chromatic images are projected upon a screen, means for moving said projector in a given path, devices for varying the path of movement of the projector while in motion, bi-chromatic scopes adjacent the projector through which the images are viewed, and a septum interposed between said scopes that divides the visual field of the patient observing said images.

5. A method which consists in projecting two images of differing color upon a screen, and bodily moving said images thereon in either fixed or changing mutual relation, while viewing said images through disassociating lenses of such color that each obscures one image while leaving the other visible, whereby each eye tends to follow independently of the other the image visible to it.

6. An apparatus comprising, in combination, a screen, a means for the simultaneous projection thereon of two identical images in complementary colors, means for selectively moving said images upon said screen in either fixed or changing mutual relation, and means applicable to the eyes of a patient to render each image visible to one eye only.

7. An optical exerciser of the kind described comprising a projector for producing two images in complementary colors in juxtaposition to each other upon a screen, means for actuating the projector to cause the images to simultaneously move upon the screen in the same path, and color filters through which the images are viewed by the patient.

8. An optical exerciser of the kind described comprising a projector, means for moving the projector in a to and fro manner, devices on the projector for producing two images moving simultaneously upon a screen said images being in juxtaposition to each other and produced in complementary colors, and color filters through which the images are viewed by the patient.

9. An optical exerciser of the kind described comprising a support, a movable projector mounted thereon, means for moving the projector in a plurality of directions and paths, devices associated with the projector to produce two images moving simultaneously upon a screen said images being adjacent each other and in complementary colors, means for altering the direction and path of the projector while moving in a given path, and filters of complementary colors through which the moving images are viewed by the patient.

10. An optical exerciser of the kind described comprising a standard, a shaft rotatable thereon, means for actuating said shaft, a head, a projection tube supported by said head and mounted for tiltable adjustment with respect thereto, a spider reciprocably mounted on said head and connected with one end of said tube, a throwout mechanism operatively connecting said head and shaft, and means operatively connecting said shaft with said spider whereby to reciprocate said tube, said last-named means and said throw-out mechanism being adapted for operation during movement of the tube to automatically change the relative position and direction of movement of the tube.

11. An optical exerciser of the kind described comprising a standard, a shaft rotatable thereon, means for actuating said shaft, a head rotatably mounted on said standard, a projection tube pivoted on said tube, means operatively connecting said tube with said shaft to normally impart a reciprocatory motion to said tube, and means for adjusting said tube upon its pivot during rotation of said head, said head having rotational movement independent of the motion imparted to it by said shaft whereby the direction of movement of said tube may be altered during operation of the apparatus.

12. An optical exerciser of the kind described comprising means for producing two relatively movable juxtapositioned images before the patient's eyes, filters of complementary colors through which the images are viewed, and means for illuminating the images in complementary colors.

13. An optical exerciser of the kind described comprising means for producing two juxtapositioned images before the patient's eyes, filters of complementary colors through which the images are viewed, means for illuminating the images in complementary colors, and devices for causing simultaneous movement of the images in predetermined paths.

14. An optical exerciser of the kind described comprising a standard, a shaft rotatable thereon, means for actuating said shaft, a head, a projection tube supported by said head and mounted for tiltable adjustment with respect thereto, a spider reciprocably mounted on said head and having operative connection with said tube, a throw-out mechanism operatively connecting said head and shaft, and means operatively connecting said shaft and spider whereby to reciprocate said tube, said last-named means and said throw-out mechanism being adapted for operation during movement of the tube to automatically change the relative position and direction of movement of the tube.

15. A method which consists in projecting upon a screen two images of identical shape and of complementary colors, and bodily moving said images on the screen in either fixed or changing mutual relation, while viewing said images through disassociating lenses, one for each eye, of such color that each obscures one image while leaving the other visible, whereby each eye tends to follow independently of the other the image visible to it.

16. A method comprising simultaneously projecting two images of differing colors upon a screen, rendering one of said images invisible to the right eye and the other invisible to the left eye, and moving such images into a predetermined apparent relation, whereby each eye tends to follow independently of the other the image visible to it.

17. A method comprising simultaneously projecting two images of complementary colors upon a screen, applying a pair of lenses of the same complementary colors, one to each eye, for disassociation of said images, and moving such images into apparent alignment, whereby each eye tends to follow independently of the other the image visible to it.

18. An optical exercising apparatus comprising, in combination, a means for the simultaneous projection upon a screen of two identical images in complementary colors, means for selectively moving said images upon the screen in either fixed or changing mutual relation, and light screens adjacent the eyes of a patient to disassociate said images, whereby binocular fixation is inhibited.

19. An eye exercising apparatus, comprising in combination, a projector, a source of light therein, a lens system for throwing two images upon a screen and adapted for moving said images to different positions thereon, color filters adjacent said lens system whereby each of said images will appear in a different color, and a pair of color filters, which are each complementary to one of said image colors, whereby said images will be disassociated and will appear to the patient in unreal positions upon the screen, and graduations upon said projector adapted to measure the difference between said unreal positions and the actual positions of said images on the screen.

20. An optical apparatus comprising, in combination, an apparatus for projecting one red and one green image upon a screen, means for rendering the red image invisible to one eye of a patient and the green image invisible to the other eye, means for moving said images upon said screen into a predetermined apparent position as seen by the patient, and means on the projector for measuring the actual displacement of said images from said apparent position.

21. An optical apparatus comprising, in combination, means for projecting one red and one green image upon a screen and for moving said images thereon in either fixed or changing mutual relation as desired, a red color filter and a green color filter, applicable one to each eye of a patient, whereby to inhibit binocular fixation and permit each eye to follow individually the image visible through its color filter.

22. An optical apparatus comprising in combination, a projector having means for projecting a pair of bodily movable objects of identical configuration and complementary color upon a screen, a pair of scopes, one of each of said colors, adapted to be placed one in front of each eye of a patient to disassociate the retinal images of said objectives, and means for moving said object upon the screen, whereby the real position of each of said objects may be measured when said objects are moved so as to appear to the patient to be in a given position.

23. A method comprising the movement in a plane of a pair of movable objectives of identical configuration and complementary color upon a screen, the application of color screens of the same colors as said objectives, one to each eye of a patient, to chromatically disassociate the retinal images of said objectives, and the measurement of the actual relative position of said objectives, when said objectives are moved into such relative position as to be visible to the patient in a predetermined apparent position.

24. A method comprising the application to each eye of a patient of a color filter, said filters being each adapted to cut out one of two complementary colors, and the bodily movement before said screened eyes of a pair of objectives of identical size and appearance in either fixed or changing mutual relation, each of said objectives being colored in a different one of the two complementary colors of said filters.

25. A method of eye testing comprising the movement against a screen of two objectives of complementary color, applying one of a pair of color filters of the same complementary colors to each eye being tested in order to disassociate the retinal images of said objectives, and comparing the real position of said objectives upon said screen with their apparent position to the eyes being tested when moved so as to occupy a predetermined apparent position to the eyes being tested.

26. An optical exerciser of the kind described comprising a standard, a shaft rotatable thereon, means for actuating said shaft, a head rotatably mounted on said standard and operatively connected to said shaft, a projection tube pivotally mounted on said head, means operatively connecting said tube with said shaft to normally impart a reciprocatory motion to said tube, devices for tilting said tube to different angles with respect to said head whereby circular paths of motion of different diameters are secured for the outer end of the tube during rotation of the head, and clutch devices adapted to disconnect the shaft and head during movement to change the circular path of motion of the tube to a reciprocatory path.

27. An optical exerciser of the kind described comprising a suitable support, a rotatable sleeve journaled thereon, a disklike head secured to said sleeve, a projection tube pivotally mounted on said head and extending away from the same, a spider mounted on said head and movable diametrically across the same and having operative connection with an adjacent portion of said tube whereby the angularity of the tube may be changed, a slide-block guided by said spider and movable transverse thereto, an eccentrically mounted stud engaged with said slide-block and movable across the face of said head, means extending through said sleeve for adjusting said stud to different positions, and driving mechanism including a shaft extending through said sleeve.

28. An optical exerciser of the kind described comprising a suitable support, a sleeve journaled thereon, a head secured to said sleeve, a pivoted projection tube fulcrumed on said head and extending away from the same, a spider movable diametrically across said head and having operative connection with an adjacent portion of said tube to adjust the angularity thereof with respect to said head, a rotatable hollow shaft extending through said sleeve, a disk on said shaft, an eccentrically positioned stud guided radially on said disk and having operative connection with said spider, means for adjusting said stud to different positions and including a manually operated spindle extending through said hollow shaft, and means for actuating said shaft to rotate said disk and move the tube in a to and fro path.

29. An optical exerciser of the kind described comprising a suitable support, a sleeve journaled thereon, a head secured to said sleeve, a pivoted projection tube fulcrumed on said head and extending away from the same, a spider movable diametrically across said head and having operative connection with an adjacent portion of said tube to adjust the angularity thereof with respect to said head, a rotatable hollow shaft extending through said sleeve, a disk on said shaft, an eccentrically positioned stud guided radially on said disk and having operative connection with said spider, means for adjusting said stud to different positions and including a manually operated spindle extending through said hollow shaft, means for actuating said shaft to rotate said disk and move the tube in a to and fro path, and a clutch mechanism operatively connecting said shaft to said head for bodily rotating the latter and said disk in unison to cause the tube to describe a circular path.

Signed at Chicago, Cook County, Illinois, this 30th day of December, 1927.

ALEXANDER S. CAMERON.